United States Patent
Pancheri

(10) Patent No.: US 6,663,154 B2
(45) Date of Patent: Dec. 16, 2003

(54) SERVOCONTROLLED MAGNETIC GRIPPING DEVICE

(75) Inventor: Italo Pancheri, Livo (IT)

(73) Assignee: Famatec S.r.l., Taio (IT)

( * ) Notice: Subject to any disclaimer, the term of this patent is extended or adjusted under 35 U.S.C. 154(b) by 13 days.

(21) Appl. No.: 10/150,651

(22) Filed: May 17, 2002

(65) Prior Publication Data

US 2002/0190532 A1 Dec. 19, 2002

(30) Foreign Application Priority Data

May 17, 2001 (IT) .................................. BO2001A0305

(51) Int. Cl.[7] .............................. H01F 7/04; B23Q 3/15; B66C 1/04
(52) U.S. Cl. ........................ 294/65.5; 335/205; 335/288
(58) Field of Search .......................... 294/65.5; 335/285, 335/286, 288, 205, 207; 269/8; 901/40

(56) References Cited

U.S. PATENT DOCUMENTS

| | | | | |
|---|---|---|---|---|
| 2,471,067 A | * | 5/1949 | Hitchcock | 335/295 |
| 4,227,164 A | * | 10/1980 | Kitahara | 335/230 |
| 4,250,478 A | * | 2/1981 | Cardone et al. | 294/65.5 |
| 4,251,791 A | * | 2/1981 | Yanagisawa et al. | 335/285 |
| 4,921,292 A | * | 5/1990 | Harwell et al. | 294/65.5 |
| 5,166,654 A | * | 11/1992 | Doyelle | 335/288 |
| 5,435,613 A | * | 7/1995 | Jung | 294/65.5 |
| 6,076,873 A | * | 6/2000 | Jung | 294/65.5 |
| 6,292,078 B1 | * | 9/2001 | Cardone et al. | 294/65.5 |
| 6,331,810 B1 | * | 12/2001 | Jung | 294/65.5 |
| 2002/0105400 A1 | * | 8/2002 | Underwood et al. | 335/205 |

FOREIGN PATENT DOCUMENTS

| | | | | |
|---|---|---|---|---|
| GB | 2205445 | * | 12/1988 | 294/65.5 |
| SU | 1570894 | * | 6/1990 | 901/40 |
| WO | WO 99/65644 | | 12/1999 | |
| WO | WO 01/43147 | | 6/2001 | |

\* cited by examiner

Primary Examiner—Dean J. Kramer
Assistant Examiner—Paul T. Chin
(74) Attorney, Agent, or Firm—Sheridan Ross PC

(57) ABSTRACT

A magnetic gripping device having a magnetic assembly in turn having an outer magnetic core, and an inner magnetic core mounted inside the outer magnetic core so as to rotate, about a given axis of rotation, between a first operating position, in which the inner magnetic core prevents the outer magnetic core from attaching magnetically to the surface of a generic part of ferromagnetic material, and a second operating position, in which the inner magnetic core allows the outer magnetic core to attach magnetically to the surface of the part; the gripping device also having a torque-control actuating device, which, on command, rotates the inner magnetic core in such a manner as to set it selectively to the first or second operating position, while controlling the value of the twisting torque employed in doing so.

8 Claims, 4 Drawing Sheets

SERVOCONTROLLED MAGNETIC GRIPPING DEVICE

The present invention relates to a servocontrolled magnetic gripping device.

More specifically, the present invention relates to a magnetic gripping device particularly suitable for assembly on pneumatic manipulators, to which the following description refers purely by way of example.

BACKGROUND OF THE INVENTION

As is known, on certain assembly lines, particularly large, heavy parts are handled manually with the aid of pneumatic manipulators for sequentially engaging the part, lifting it to a predetermined height, and then compensating the weight of the part itself so that it can subsequently be moved manually by the operator with a minimum amount of effort.

When handling parts made of ferromagnetic material, such as ferrous sheet metal, the free end of the pneumatic manipulator is normally fitted with a magnetic gripping device for selectively engaging and retaining the part using the magnetic field produced by the device itself.

With reference, for example, to patent WO-9965644, the magnetic gripping devices normally featured on medium-small-capacity pneumatic manipulators comprise an outer anchoring surface, which rests on the part to be gripped, and are normally defined by two magnetic cores mounted for rotation one inside the other, so that the inner magnetic core can be rotated manually, by a given angle about a given axis of rotation, between two distinct operating positions, in which the magnetic poles of the inner magnetic core face the magnetic poles of the outer magnetic core to eliminate or amplify the magnetic field produced by the latter at the outer anchoring surface.

The inner and outer magnetic cores are both made of ferromagnetic material and permanent magnets, and are so shaped that the operator can only switch from the first operating position—in which the outer anchoring surface has substantially no magnetic field—to the second operating position—in which the outer anchoring surface is crossed by a strong magnetic field—when the outer anchoring surface is positioned resting on a ferromagnetic part.

In other words, the inner and outer magnetic cores are so shaped that the force exerted by the operator on the lever controlling rotation of the inner magnetic core is particularly high when the outer anchoring surface does not rest on a ferromagnetic part, and, conversely, is relatively low when the outer anchoring surfaces does rest on a ferromagnetic part.

The main drawback of magnetic gripping devices of the above type is that of failing to provide any guarantee of retaining the ferromagnetic part once the inner magnetic core is rotated manually by the operator from the first to the second operating position.

In this type of gripping device, in fact, the maximum load, that can be lifted, depends predominantly on the distance or so-called "gap" created between the surface of the part for lifting and the outer anchoring surface of the gripping device by dirt on either one of the two surfaces.

Very frequently, in fact, owing to a thin film of oil, dust or paint between the two surfaces, the ferromagnetic part is suddenly released by the gripping device after it has been lifted and its weight compensated by the pneumatic manipulator. And since sudden variations in load produced by accidental release of the part cannot be compensated immediately by the pneumatic load-compensating system on the pneumatic manipulator, the arm of the manipulator rears uncontrollably and may strike the ceiling with considerable force.

Accidental release of the part also endangers the safety of the operator. In fact, not infrequently, the part drops directly on to the operator's legs, thus causing serious injury.

SUMMARY OF THE INVENTION

It is an object of the present invention to provide a magnetic gripping device designed to eliminate the aforementioned drawbacks.

According to the present invention, there is provided a magnetic gripping device comprising a magnetic assembly defined by an outer magnetic core, and by an inner magnetic core mounted inside the outer magnetic core so as to rotate, about a given axis of rotation, between a first operating position, in which the inner magnetic core prevents the outer magnetic core from attaching magnetically to the surface of a generic part of ferromagnetic material, and a second operating position, in which the inner magnetic core allows the outer magnetic core to attach magnetically to the surface of said part; the gripping device being characterized by comprising torque-control actuating means, which, on command, rotate the inner magnetic core in such a manner as to set it selectively to the first or second operating position, while controlling the value of the twisting torque employed in doing so.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
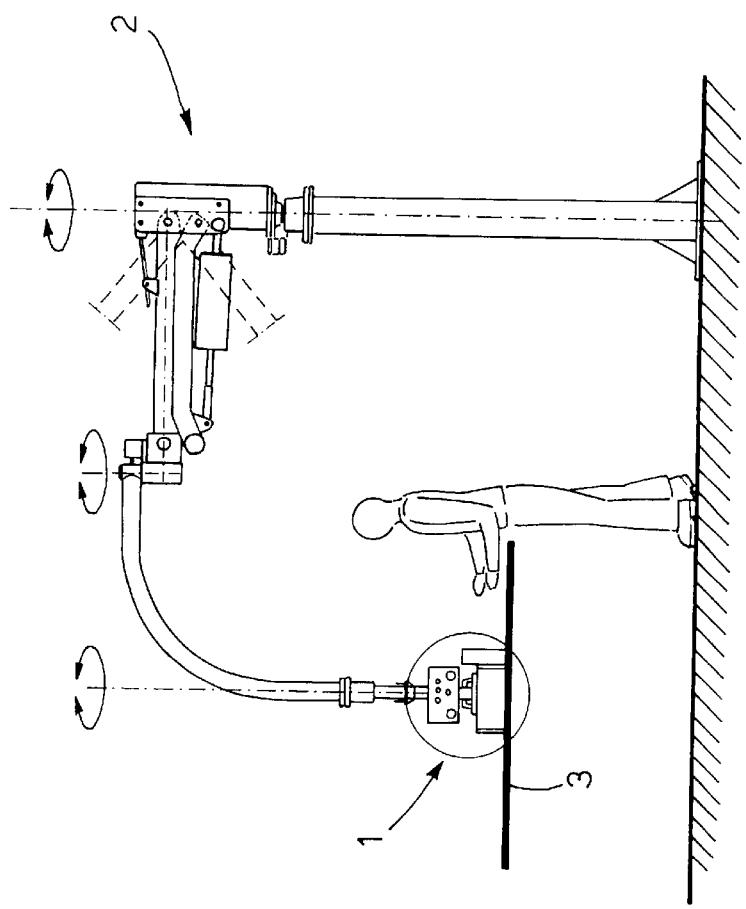
FIG. 1 shows, schematically, a pneumatic manipulator equipped with a magnetic gripping device in accordance with the teachings of the present invention.
Figure 1:
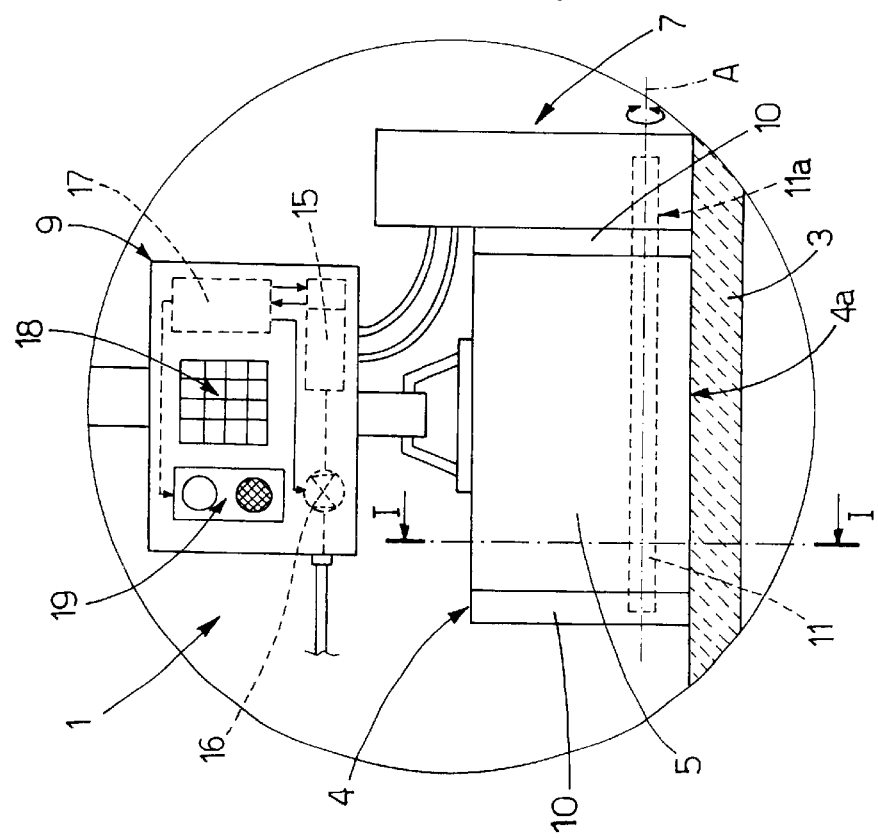

Number 1 in FIG. 1 indicates as a whole a magnetic gripping device, which is especially suitable for assembly on any type of pneumatic manipulator 2 to lift and move parts 3 of ferromagnetic material.

In the example shown, gripping device 1 is designed to attach, on command and using the magnetic field produced by itself, to any part 3 of ferromagnetic material, so that part 3 is made temporarily integral with the free end of the articulated arm of pneumatic manipulator 2, and can be lifted and handled by an operator with the aid of pneumatic manipulator 2.

In addition to lifting parts of ferromagnetic material by means of pneumatic manipulator 2, gripping device 1 may obviously also be used for other purposes, such as clamping a part in position on a work surface.

Figure 2:
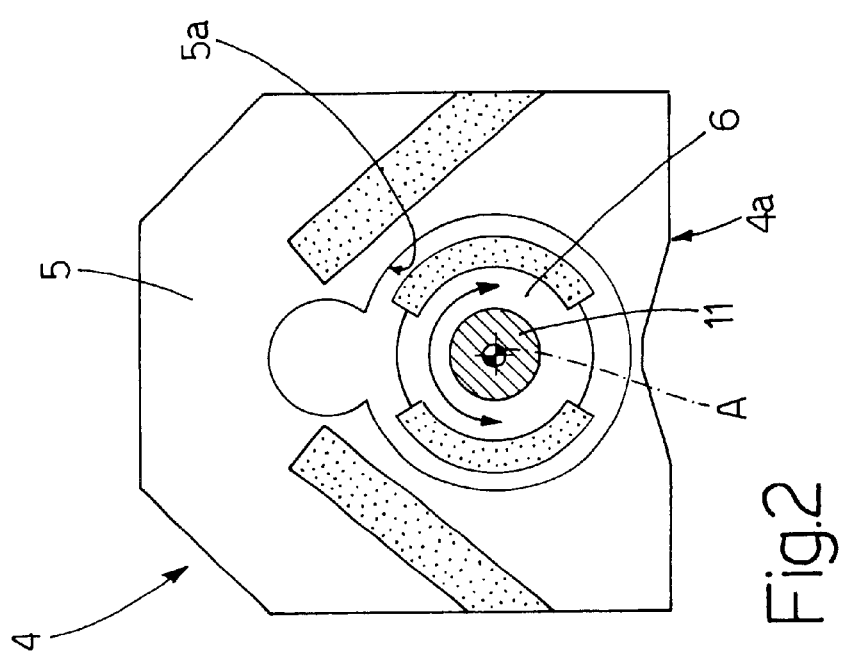
FIG. 2 shows a section along line I—I of the FIG. 1 magnetic gripping device.
Figure 3:
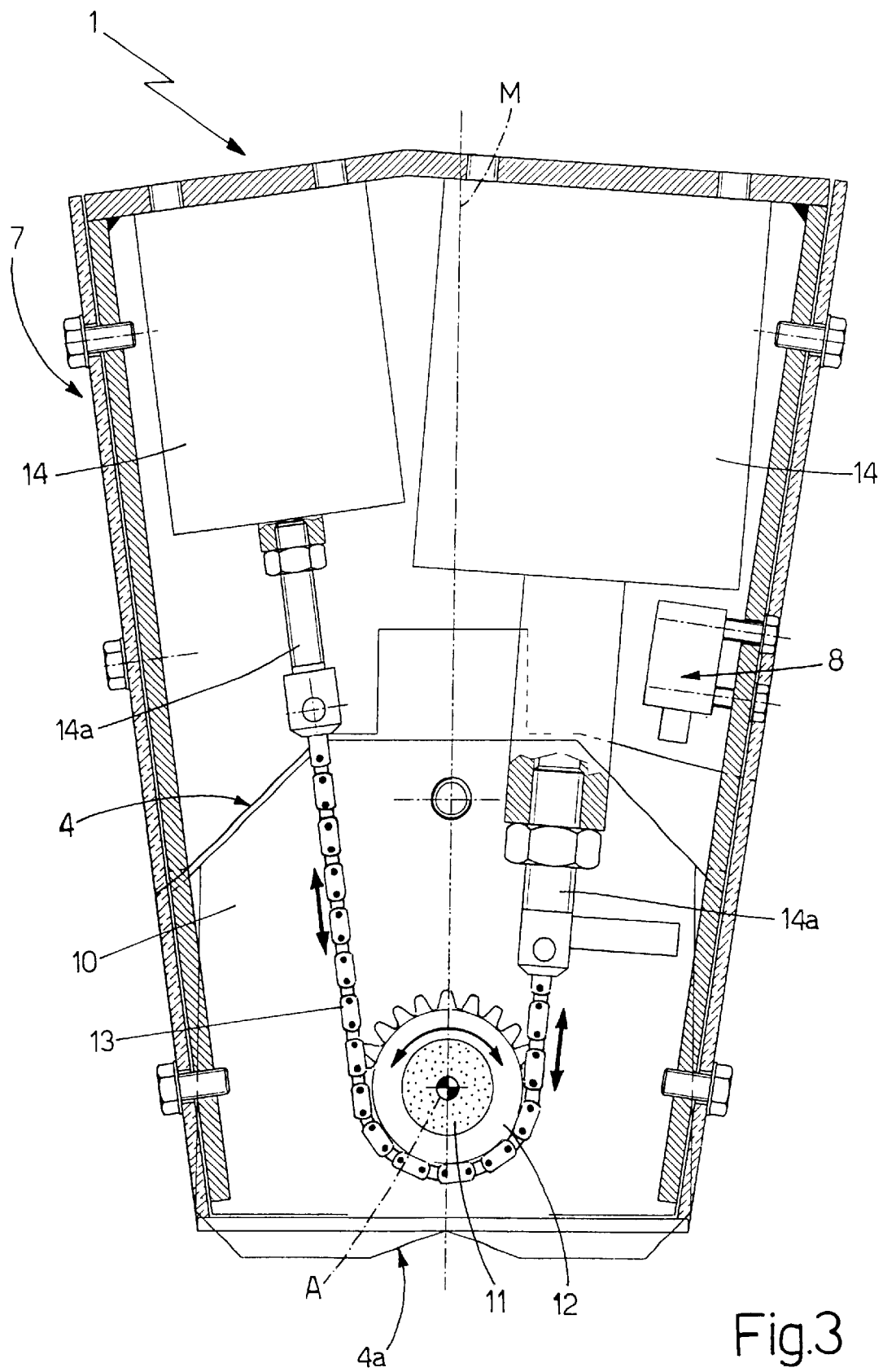
FIGS. 3 and 4 show two larger-scale side views, with parts in section and parts removed for clarity, of a detail of the FIG. 1 magnetic gripping device.
Figure 4:
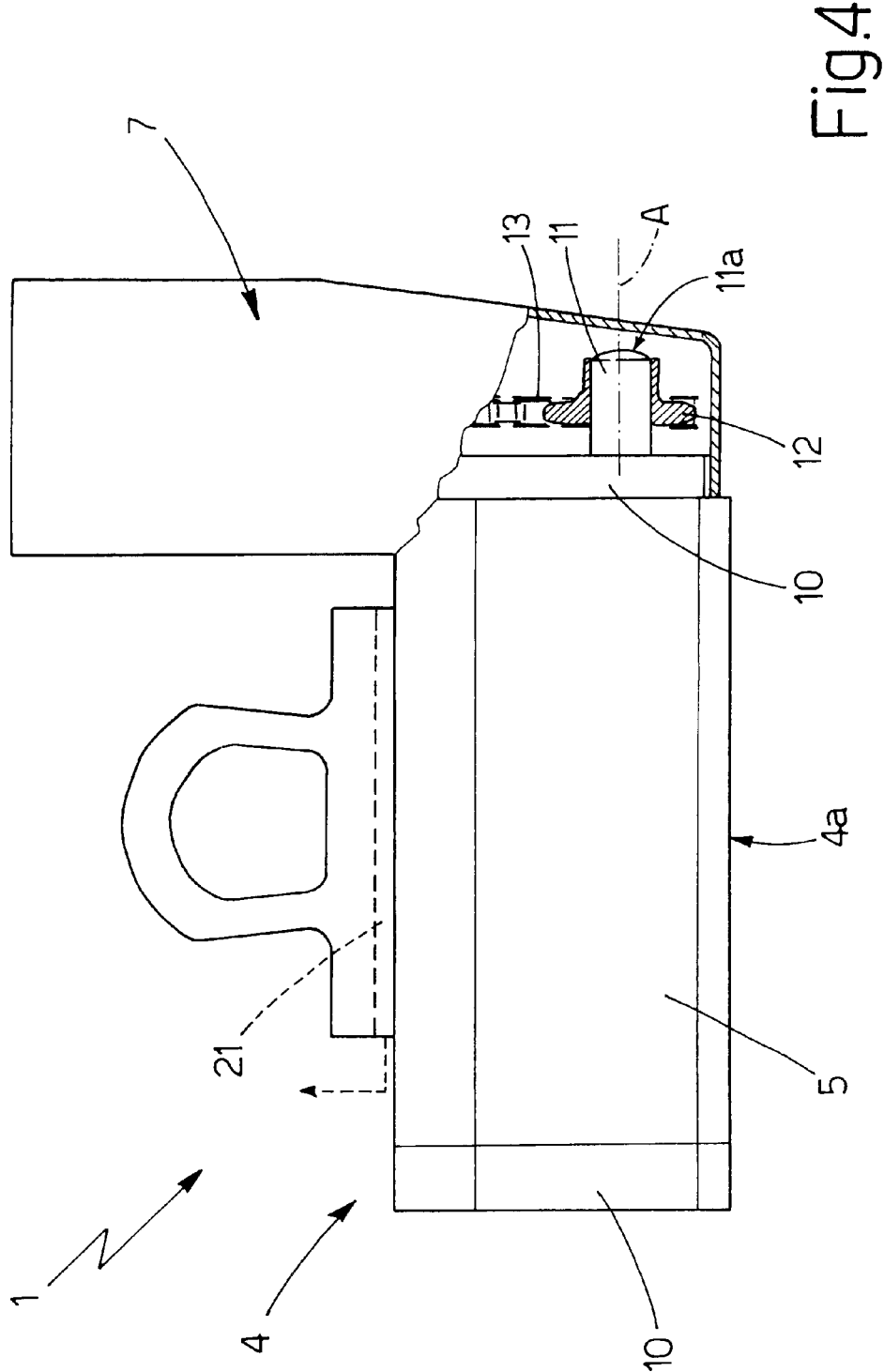

With particular reference to FIGS. 2, 3 and 4, gripping device 1 comprises a magnetic assembly 4, which in turn comprises an outer anchoring surface 4a, which rests on part 3 to be engaged, an appropriately shaped outer magnetic core 5, and an inner magnetic core 6 mounted inside outer magnetic core 5 to rotate between two distinct operating positions corresponding to two distinct configurations of the magnetic circuit of magnetic assembly 4. In the first circuit configuration, outer anchoring surface 4a is not crossed by the magnetic field lines, and is therefore prevented from attaching magnetically to the surface of part 3; whereas, in the second circuit configuration, outer anchoring surface 4a is crossed by the magnetic field lines, and can therefore attach magnetically to the surface of part 3 to lift the part.

Gripping device 1 also comprises a torque-control actuating device 7, which, on command, rotates inner magnetic core 6 so as to set it selectively to either of said two operating positions; a position sensor 8 for determining when inner magnetic core 6 is in the operating position enabling magnetic assembly 4 to engage part 3, and possibly for determining when inner magnetic core 6 is in the operating position preventing magnetic assembly 4 from engaging part 3; and a control unit 9 for controlling actuating device 7 as commanded by the operator, for determining the coupling condition of magnetic assembly 4 and part 3 on the basis of signals from at least position sensor 8, and for possibly also supplying acoustic or visual coupling condition signals.

With reference to FIGS. 2, 3 and 4, in the example shown, inner magnetic core 6 is substantially cylindrical, and is mounted to rotate, about its longitudinal axis A, inside a through cavity 5a formed in and along the whole length of the body of outer magnetic core 5.

Outer anchoring surface 4a of magnetic assembly 4 is defined by one of the outer lateral surfaces of outer magnetic core 5, and outer and inner magnetic cores 5 and 6 are made of ferromagnetic material and permanent magnets, so that inner magnetic core 6 can rotate, by a given angle $\alpha$ and about axis A, between a first operating position—in which the magnetic poles of inner magnetic core 6 are positioned facing the opposite magnetic poles of outer magnetic core 5, so as to substantially eliminate the magnetic field produced by the latter at outer anchoring surface 4a—and a second operating position—in which the magnetic poles of inner magnetic core 6 are positioned facing the like magnetic poles of outer magnetic core 5, so as to amplify the magnetic field produced by the latter at outer anchoring surface 4a.

In the example shown, magnetic assembly 4 also comprises two lateral cover plates 10 fixed to the two axial ends of outer magnetic core 5 to close the two openings of cavity 5a; and a shaft 11 for supporting inner magnetic core 6, and which extends, coaxially with axis A, along the whole length of magnetic assembly 4. Inner magnetic core 6 is fitted to shaft 11; and shaft 11 is mounted on the two lateral plates 10 so as to rotate about axis A, and has an end portion 11a projecting from one of lateral plates 10.

Being known, magnetic assembly 4 will not be described further; any further information being obtainable in specialized literature, such as Patent WO-9965644.

With reference to FIGS. 3 and 4, torque-control actuating device 7 is connected to end portion 11a of shaft 11, and, on command, rotates shaft 11 clockwise or anticlockwise by said angle $\alpha$ to set inner magnetic core 6 to the first or second operating position, while at the same time controlling the value of the maximum twisting torque imparted to shaft 11 in doing so.

In the example shown, actuating device 7 comprises a gear 12 fitted to end portion 11a of shaft 11; an open chain 13 wound partly about gear 12 to form a U in a plane perpendicular to axis A of shaft 11; and two pneumatic linear actuators 14 for drawing chain 13 back and forth to rotate gear 12 and shaft 11.

Linear actuators 14 are fixed to the outer casing of magnetic assembly 4, on opposite sides of the center plane M containing axis A, and each has an output shaft 14a integral with a corresponding end of chain 13, so as to slide chain 13 by coordinated axial displacement of the two output shafts 14a.

With reference to FIG. 1, actuating device 7 comprises an electrically operated air distributor 15 for regulating pressurized air supply to pneumatic linear actuators 14 on command, so as to produce coordinated axial displacements of output shafts 14a of pneumatic linear actuators 14; and a pressure-regulating valve 16 located upstream from air distributor 15 to maintain a predetermined air supply pressure $P_o$ to air distributor 15, and therefore to pneumatic linear actuators 14.

Pressure-regulating valve 16 may be controlled either electronically—so that supply pressure $P_o$ to air distributor 15 can be regulated directly by control unit 9—or manually.

In the example shown, position sensor 8 is defined by a microswitch located alongside output shaft 14a of one of pneumatic linear actuators 14 to indicate, by closure of an electric contact, when the relative output shaft 14a is so positioned as to set inner magnetic core 6 of magnetic assembly 4 to the second operating position. Position sensor 8 may obviously also comprise a second microswitch for indicating when the output shaft 14a is so positioned as to set inner magnetic core 6 of magnetic assembly 4 to the first operating position.

With reference to FIG. 1, in the example shown, control unit 9 comprises an electronic central control unit 17 for controlling air distributor 15 and, if possible, pressure-regulating valve 16; an operator control panel 18 by which to impart commands to electronic central control unit 17; and an acoustic and/or visual signaling device 19 for informing the operator when part 3 is engaged successfully by gripping device 1.

Before describing operation of gripping device 1, it should be pointed out that the maximum twisting torque which must be imparted to shaft 11 to move inner magnetic core 6 from the first to the second operating position has been found by tests to increase in inverse proportion to the maximum load that can be lifted by magnetic assembly 4.

More specifically, the maximum twisting torque, which must be imparted to shaft 11 to move inner magnetic core 6 from the first to the second operating position, increases alongside an increase in the "gap" created between the surface of part 3 to be lifted and outer anchoring surface 4a of magnetic assembly 4; whereas the maximum load that can be lifted by magnetic assembly 4 decreases alongside an increase in the size of the "gap". Consequently, the greater the value of the twisting torque which must be imparted to shaft 11 to move inner magnetic core 6 from the first to the second operating position, i.e. for gripping device 1 to engage part 3, the smaller the maximum weight of part 3 that can be lifted with no risk of detachment.

Operation of gripping device 1 will now be described assuming pressure-regulating valve 16 is electrically controlled and therefore controlled directly by electronic central control unit 17.

In actual use, given the maximum weight $P_{max}$ of parts 3 for handling, the operator enters this value on control panel 18 of control unit 9; and electronic central control unit 17, on the basis of the lifting characteristics of magnetic assembly 4 (i.e. the curve relating the maximum twisting torque for switching magnetic assembly 4 to the maximum weight that can be lifted by the assembly), controls torque-control actuating device 7 to enable it, on command, to move inner magnetic core 6 from the first to the second operating position, while imparting to shaft 11 a maximum twisting torque no higher than that guaranteeing a part 3 of weight $P_{max}$ or less can be lifted.

In the example shown, electronic central control unit 17 controls pressure-regulating valve 16 so that the pressure $P_o$ of the air supply to air distributor 15 is sufficient to ensure the maximum twisting torque imparted to shaft 11 by pneumatic linear actuators 14 is no higher that that guaranteeing a part 3 of weight $P_{max}$ or less can be lifted safely.

The maximum twisting torque that can be produced by actuating device 7, in fact, is a function of the pressure of the air supply to pneumatic linear actuators 14.

In the case of a manually controlled pressure-regulating valve 16, the pressure of the air supply to air distributor 15 is regulated manually by the operator.

Once the pressure of the air supply to air distributor 15 is regulated, gripping device 1 is ready for use by the operator, who, again working from control panel 18, switches inner magnetic core 6 from one operating position to the other so that gripping device 1 grips or releases part 3.

In the example shown, on the basis of the commands entered by the operator, electronic central control unit 17 controls air distributor 15 to feed pressurized air selectively to either one of pneumatic linear actuators 14, so as to rotate shaft 11 clockwise or anticlockwise by an angle equal to said angle α, and so switch inner magnetic core 6 from the first to the second operating position or vice versa.

It should be pointed out that, in this embodiment, torque-control actuating device 7 can only rotate inner magnetic core 6 from the first to the second operating position when the torque required to do so is less than or equal to the maximum torque it is capable of providing. In other words, actuating device 7 can only complete magnetic coupling of magnetic assembly 4 and part 3 if the magnetic coupling in question conforms with requirements, i.e. if the gap is small enough to ensure part 3 can be lifted in absolute safety, i.e. with no risk of accidental release.

Given a maximum time for the switch to be completed, electronic central control unit 17, on the basis of signals from position sensor 8, is able to determine and inform the operator whether part 3 has been successfully engaged or released by magnetic assembly 4. In the example shown, electronic central control unit 17 indicates safe gripping of part 3, i.e. with no risk of accidental release of the part, by activating an indicator light 19 and/or buzzer on receiving from position sensor 8 a signal indicating output shaft 14a of the pneumatic linear actuator 14 has reached the required position.

In addition to the above, electronic central control unit 17 preferably, though not necessarily, also communicates with the electronic central control unit (not shown) controlling pneumatic manipulator 2, so as to disable operation of the manipulator until part 3 is engaged correctly and safely.

Figure 5:
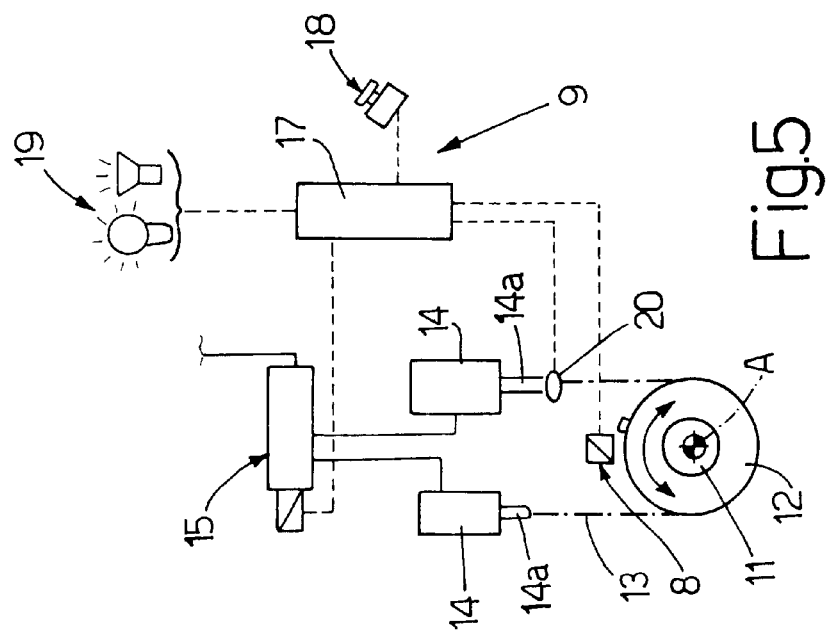
FIG. 5 shows, schematically, a variation of the magnetic gripping device in FIGS. 1 to 4.

With reference to FIG. 5, in a further embodiment of gripping device 1, torque-control actuating device 7 has no pressure-regulating valve 16, and comprises a load cell 20 for determining instant by instant the axial force transmitted by the two pneumatic linear actuators 14 to shaft 11 via chain 13 and gear 12, so as to work out the torque imparted to shaft 11 by actuating device 7.

In this case, torque-control actuating device 7 is therefore always able to complete switching of the magnetic core from the first to the second operating position or vice versa, by there being no set limit to the maximum torque it can provide, other than, obviously, that imposed by the maximum pressure made available by the pneumatic circuit supplying it.

Load cell 20 is obviously connected to electronic central control unit 17 to enable the control unit to determine, on the basis of the lifting characteristics of magnetic assembly 4, the maximum weight that can lifted each time, and to inform the operator of the relative value by means of an indicator (not shown). In the particular example shown, load cell 20 is interposed between chain 13 and the end of output shaft 14a of the pneumatic linear actuator 14 which pulls chain 13 to move inner magnetic core 6 from the first to the second operating position.

In this case, in addition to informing electronic central control unit 17 that rotation of inner magnetic core 6 has been completed, position sensor 8 also provides for determining which twisting torque value imparted by actuating device 7 to shaft 11 is to be used to determine the maximum load that can be lifted.

Preferably, though not necessarily, electronic central control unit 17 takes as a reference the maximum torque immediately prior to the stop signal being received by position sensor 8.

In this second embodiment, gripping device 1 may also comprise a second load cell 21 for determining the weight of part 3 engaged by magnetic assembly 4 when pneumatic manipulator 2 attempts to lift part 3. In which case, on determining the weight of part 3 is greater than the maximum weight permitted at that time, electronic central control unit 17 immediately disables pneumatic manipulator 2 and indicates an imminent operator hazard situation.

With reference to the dash-line detail in FIG. 4, in the example shown, load cell 21 is interposed between the outer casing of magnetic assembly 4 and the hook by which magnetic assembly 4 is suspended from the end of pneumatic manipulator 2.

The advantages of magnetic gripping device 1 will be clear from the foregoing description: the operator is no longer called upon to personally determine, with all the risks this entails, that gripping device 1 and part 3 are coupled firmly enough for part 3 to be lifted, thus greatly improving safety in the workplace.

Another advantage of gripping device 1 is that of no longer requiring strenuous effort on the part of the operator to operate the device manually.

Clearly, changes may be made to gripping device 1 as described and illustrated herein without, however, departing from the scope of the present invention.

In particular, in a variation not shown, as opposed to comprising gear 12, chain 13, pneumatic linear actuators 14, air distributor 15, and possibly also pressure-regulating valve 16, torque-control actuating device 7 is defined by a torque-control brushless electric motor or similar rotary electric actuating device, which is connected mechanically to shaft 11 of magnetic assembly 4 to rotate shaft 1, on command, about axis A, or keep shaft 11 stationary in a given position, while exerting a predetermined torque.

In this case, the position of shaft 11 is determined indirectly by the "encoder" this type of motor is normally equipped with, and the twisting torque exerted by actuating device 7 can be determined or limited indirectly by controlling or respectively limiting the electric current drawn by the electric motor.

What is claimed:

1. A magnetic gripping device comprising a magnetic assembly defined by an outer magnetic core, and by an inner magnetic core mounted inside the outer magnetic core so as to rotate, about a given axis of rotation, between a first operating position, in which the inner magnetic core prevents the outer magnetic core from attaching magnetically to the surface of a generic part of ferromagnetic material, and a second operating position, in which the inner magnetic core allows the outer magnetic core to attach magnetically to the surface of said part; the gripping device being characterized by comprising torque-control actuating means, which, on command, rotate the inner magnetic core in such a manner as to set it selectively to the first or second operating position, while controlling the value of the twisting torque employed in doing so.

2. A magnetic gripping device as claimed in claim 1, characterized by comprising monitoring means for determining when the inner magnetic core is set to said second operating position; and control means for determining whether magnetic coupling of the part and the magnetic assembly guarantees safe gripping of the part, on the basis of indications from said monitoring means and the maximum value of the twisting toque produced by said torque-control actuating means in moving the inner magnetic core from the first to the second operating position.

3. A magnetic gripping device as claimed in claim 2, characterized in that said control means comprise acoustic or visual signaling means for indicating to the operator the coupling condition of the magnetic assembly and the part.

4. A magnetic gripping device as claimed in claim 1, characterized in that said torque-control actuating means, when moving the inner magnetic core from the first to the second operating position, produce a twisting torque whose maximum value is less than or equal to a preset reference value.

5. A magnetic gripping device as claimed in claim 1, characterized in that said torque-control actuating means comprise detecting means for determining instant by instant the value of the twisting torque produced when moving the inner magnetic core from the first to the second operating position.

6. A magnetic gripping device as claimed in claim 1, characterized in that said inner magnetic core is fitted to a supporting shaft mounted to rotate about said axis of rotation; and said torque-control actuating means comprise a gear fitted to an end portion of said supporting shaft; an open chain wound partly about said gear; and two pneumatic linear actuators for selectively drawing the chain back and forth to rotate the gear and the supporting shaft.

7. A magnetic gripping device as claimed in claim 6, characterized in that said torque-control actuating means comprise an air distributor for regulating, on command, pressurized air supply to the two pneumatic linear actuators, so as to produce coordinated axial displacements of the output shafts of said two pneumatic linear actuators.

8. A magnetic gripping device as claimed in claim 7, characterized in that said torque-control actuating means comprise a pressure-regulating valve located upstream from the air distributor to maintain the pressure of the air supply to said air distributor at a predetermined maximum value.

* * * * *